US010773338B2

(12) United States Patent
Hirano et al.

(10) Patent No.: US 10,773,338 B2
(45) Date of Patent: Sep. 15, 2020

(54) LASER PROCESSING APPARATUS

(71) Applicant: NIPPON STEEL & SUMITOMO METAL CORPORATION, Tokyo (JP)

(72) Inventors: Koji Hirano, Kisarazu (JP); Hirofumi Imai, Kisarazu (JP); Hideyuki Hamamura, Futtsu (JP); Tatsuhiko Sakai, Oita (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/322,362

(22) PCT Filed: Jul. 3, 2014

(86) PCT No.: PCT/JP2014/067780
§ 371 (c)(1),
(2) Date: Dec. 27, 2016

(87) PCT Pub. No.: WO2016/002043
PCT Pub. Date: Jan. 7, 2016

(65) Prior Publication Data
US 2017/0157706 A1 Jun. 8, 2017

(51) Int. Cl.
*B23K 26/064* (2014.01)
*C21D 8/12* (2006.01)
(Continued)

(52) U.S. Cl.
CPC .............. *B23K 26/064* (2015.10); *C21D 8/12* (2013.01); *C22C 38/001* (2013.01);
(Continued)

(58) Field of Classification Search
CPC .............. B23K 26/064; B23K 26/0643; B23K 26/0648; B23K 26/08; B23K 26/0869;
(Continued)

(56) References Cited

U.S. PATENT DOCUMENTS 4,414,038 A 11/1983 Dausinger et al.
4,468,551 A 8/1984 Neiheisel
(Continued)

FOREIGN PATENT DOCUMENTS

CA 2795993 A1 10/2011
CN 101297050 A 10/2008
(Continued)

OTHER PUBLICATIONS

International Search Report for PCT/JP2014/067780 (PCT/ISA/210) dated Oct. 7, 2014.
(Continued)

*Primary Examiner* — Alex M Valvis
(74) *Attorney, Agent, or Firm* — Birch, Stewart, Kolasch & Birch, LLP

(57) ABSTRACT

In a laser processing apparatus for refining magnetic domains of a grain-oriented electromagnetic steel sheet by setting a laser beam to be focused on the grain-oriented electromagnetic steel sheet and scanned in a scanning direction, the laser beam focused on the grain-oriented electromagnetic steel sheet is linearly polarized light, and the angle between the linear polarization direction and the scanning direction is equal to or higher than 0° and lower than 45°.

12 Claims, 10 Drawing Sheets

(51) Int. Cl.
  *C22C 38/06* (2006.01)
  *H01F 1/16* (2006.01)
  *C22C 38/00* (2006.01)
  *C22C 38/02* (2006.01)
  *C22C 38/04* (2006.01)
  *H01F 1/03* (2006.01)

(52) U.S. Cl.
  CPC ............ *C22C 38/002* (2013.01); *C22C 38/02* (2013.01); *C22C 38/04* (2013.01); *C22C 38/06* (2013.01); *H01F 1/0306* (2013.01); *H01F 1/16* (2013.01); *C22C 38/00* (2013.01)

(58) Field of Classification Search
  CPC ............ B23K 26/0876; B23K 26/0884; B23K 26/0892; C22C 38/001; C22C 38/002; C22C 38/02; C22C 38/04; C22C 38/06; H01F 1/0306; H01F 1/16
  USPC .................................... 219/121.73, 121.74
  See application file for complete search history.

(56) References Cited

U.S. PATENT DOCUMENTS

| | | | |
|---|---|---|---|
| 4,500,771 A | | 2/1985 | Miller |
| 5,057,664 A | * | 10/1991 | Johnson ............... B23K 26/06 219/121.69 |
| 5,302,802 A | * | 4/1994 | Fujinaga ............ B23K 26/0884 219/121.74 |
| 5,948,172 A | * | 9/1999 | Neiheisel ............. B08B 7/0042 134/1 |
| 7,157,038 B2 | * | 1/2007 | Baird ................... B23K 26/083 264/400 |
| 7,259,082 B2 | * | 8/2007 | Tanaka ............... B23K 26/0736 257/E21.134 |
| RE43,487 E | * | 6/2012 | O'Brien ............... B23K 26/032 264/400 |
| 2002/0149136 A1 | | 10/2002 | Baird et al. |
| 2004/0104208 A1 | | 6/2004 | Ijima et al. |
| 2006/0169362 A1 | * | 8/2006 | Sakai ................... C21D 8/1294 148/110 |
| 2007/0131962 A1 | * | 6/2007 | Yazaki ................. B23K 26/032 257/103 |
| 2007/0151963 A1 | * | 7/2007 | Tanaka ................. B23K 26/06 219/121.78 |
| 2009/0107585 A1 | | 4/2009 | Sakai et al. |
| 2009/0114316 A1 | | 5/2009 | Sakai et al. |
| 2012/0135607 A1 | | 5/2012 | Shimoi et al. |
| 2012/0135608 A1 | | 5/2012 | Shimoi et al. |
| 2014/0312009 A1 | | 10/2014 | Okabe et al. |
| 2015/0253242 A1 | | 9/2015 | Ito et al. |
| 2015/0318091 A1 | | 11/2015 | Hirano et al. |

FOREIGN PATENT DOCUMENTS

| | | | | |
|---|---|---|---|---|
| CN | 101415847 A | | 4/2009 | |
| CN | 103025478 A | | 4/2013 | |
| CN | 103433618 A | | 12/2013 | |
| EP | 0069383 A1 | | 1/1983 | |
| EP | 1953249 A1 | | 8/2008 | |
| EP | 2599883 A1 | | 6/2013 | |
| JP | 58-29592 A | | 2/1983 | |
| JP | 59-33802 A | | 2/1984 | |
| JP | 61-203421 A | | 9/1986 | |
| JP | 2-15112 A | | 1/1990 | |
| JP | 2-52192 A | | 2/1990 | |
| JP | 2-138414 A | | 5/1990 | |
| JP | 4-253583 A | | 9/1992 | |
| JP | 10-298654 A | | 11/1998 | |
| JP | 2007-119821 A | | 5/2007 | |
| JP | 2013-71148 A1 | | 4/2013 | |
| JP | 2013071148 | * | 4/2013 | ............ B23K 26/00 |
| KR | 10-0877936 B1 | | 1/2009 | |
| RU | 2104137 C1 | | 2/1998 | |
| RU | 2238340 C1 | | 10/2004 | |
| RU | 2371487 C1 | | 10/2009 | |
| RU | 2374334 C1 | | 11/2009 | |
| RU | 2509163 C1 | | 3/2014 | |
| RU | 2509813 C1 | | 3/2014 | |
| RU | 2516216 C2 | | 5/2014 | |
| SU | 1798090 A1 | | 2/1993 | |
| WO | WO 03/002289 A1 | | 1/2003 | |
| WO | WO 2004/083465 A1 | | 9/2004 | |
| WO | WO 2011/129921 A2 | | 10/2011 | |
| WO | WO 2013/099219 A1 | | 7/2013 | |
| WO | WO 2014/050907 A1 | | 4/2014 | |
| WO | WO 2014/073599 A1 | | 5/2014 | |

OTHER PUBLICATIONS

Written Opinion of the International Searching Authority for PCT/JP2014/067780 (PCT/ISA/237) dated Oct. 7, 2014.
Extended European Search Report, dated Dec. 22, 2017, for corresponding European Application No. 14896687.2.
Chinese Office Action and Search Report, dated Oct. 31, 2017 for corresponding Chinese Application No. 201480080203.4, with English translations.
Korean Office Action, dated Jun. 14, 2018, for corresponding Korean Application No. 10-2017-7000363, with an English translation.
Russian Office Action and Search Report for counterpart Russian Application No. 2016152244, dated Mar. 29, 2018, with English translation.
Brazilian Office Action and Search Report for counterpart Brazilian Application No. BR112016030575-2, dated Jul. 16, 2019, with English translation.
Indian Office Action, dated Jan. 14, 2020, for counterpart Indian Application No. 201717001622, with an English translation.

* cited by examiner

LASER PROCESSING APPARATUS

TECHNICAL FIELD OF THE INVENTION

The present invention relates to a laser processing apparatus which irradiates laser beams on a grain-oriented electromagnetic steel sheet used for the core of a transformer or the like thereby refining magnetic domains.

RELATED ART

A grain-oriented electromagnetic steel sheet is easily magnetized in the rolling direction during the production of the steel sheet. Therefore, the grain-oriented electromagnetic steel sheet is also called a unidirectional electromagnetic steel sheet. The grain-oriented electromagnetic steel sheet is used as a material for forming the core of an electrical device such as a transformer or a rotary machine.

When the grain-oriented electromagnetic steel sheet is magnetized, energy loss such as core loss is generated. In recent years, due to the progress of global warming, energy-saving electrical devices have been required worldwide. Therefore, a technology for further reducing the core loss in a grain-oriented electromagnetic steel sheet is necessary.

Core loss is classified into eddy-current loss and hysteresis loss. Eddy-current loss is classified into classical eddy-current loss and anomalous eddy-current loss. In order to reduce classical eddy-current loss, a grain-oriented electromagnetic steel sheet which has an insulating coating film formed at the surface and has a small sheet thickness is known. For example, Patent Document 1 mentioned below discloses a grain-oriented electromagnetic steel sheet which includes a glass coating film formed on the surface of a steel sheet base steel material, and an insulating coating film formed on the surface of the glass coating film.

For example, Patent Documents 2 and 3 mentioned below disclose a laser magnetic domain control method capable of limiting anomalous eddy-current loss. In the laser magnetic domain control method, the surface of a grain-oriented electromagnetic steel sheet in which an insulating coating film is formed is irradiated with a laser beam and the laser beam is scanned substantially along a width direction of the grain-oriented electromagnetic steel sheet (that is, a direction substantially perpendicular to the rolling direction of the grain-oriented electromagnetic steel sheet). As a result, a number of residual strains are periodically formed along the rolling direction on the surface of the grain-oriented electromagnetic steel sheet (that is, the surface of the base steel material) such that magnetic domains of the grain-oriented electromagnetic steel sheet are refined.

According to the laser magnetic domain control method, a thermal history having a steep temperature gradient along the thickness direction is generated in the outermost surface of the grain-oriented electromagnetic steel sheet through the scanning with the laser beam. Since the thermal history is given, residual strains are generated on the surface of the base steel material of the grain-oriented electromagnetic steel sheet, and circulating current magnetic domains are formed due to the residual strains. Intervals between 180° domain walls are refined by the circulating current magnetic domains, and as a result, anomalous eddy-current loss in the grain-oriented electromagnetic steel sheet is reduced.

As described above, intervals between 180° domain walls are refined by the circulating current magnetic domains formed on the surface of the base steel material, and as a result, anomalous eddy-current loss is reduced. However, the circulating current magnetic domains formed on the surface of the base steel material cause an increase in hysteresis loss. Therefore, in order to minimize core loss including eddy-current loss and hysteresis loss, it is effective to reduce the width of the circulating current magnetic domains. For example, Patent Document 3 discloses a method in which strong strains are formed in a narrow region by using a $TEM_{00}$ mode laser beam, which enables a very small beam spot size by its excellent focusing characteristics, such that circulating current magnetic domains which are narrow and have sufficient strength are obtained.

PRIOR ART DOCUMENT

Patent Document

[Patent Document 1] Japanese Unexamined Patent Application, First Publication No. 2007-119821

[Patent Document 2] Japanese Unexamined Patent Application, First Publication No. S59-33802

[Patent Document 3] PCT International Publication No. WO2004/083465

[Patent Document 4] Japanese Unexamined Patent Application, First Publication No. S58-29592

[Patent Document 5] Japanese Unexamined Patent Application, First Publication No. H2-52192

DISCLOSURE OF THE INVENTION

Problems to be Solved by the Invention

In the laser magnetic domain control method in the related art, in order to perform scanning with the laser beam rapidly and efficiently, an optical system which linearly scans a single laser beam from a position at a predetermined height from the surface of a grain-oriented electromagnetic steel sheet onto the grain-oriented electromagnetic steel sheet along a width direction thereof is used.

In a case where this optical system is used, the laser beam is incident perpendicular to the surface of the grain-oriented electromagnetic steel sheet at a center portion of the laser scanning width. That is, in a case where the incident position of the laser beam is coincident with the center portion of the laser scanning width, the angle between the direction perpendicular (normal direction) to the surface of the grain-oriented electromagnetic steel sheet and the propagation direction of the laser beam (an incident angle $\phi$ of the laser beam) becomes 0°. On the other hand, as the incident position of the laser beam approaches an end portion of the laser scanning width, the incident angle $\phi$ of the laser beam increases.

In such an optical system, as the incident position of the laser beam approaches the end portion apart from the center portion of the laser scanning width (as the incident angle $\phi$ of the laser beam increases), the beam diameter of the laser beam increases, and the power density of the laser beam decreases.

As a result, a temperature gradient along the thickness direction given to the end portion of the laser scanning width becomes smaller than a temperature gradient along the thickness direction given to the center portion of the laser scanning width, and it becomes difficult to appropriately refine magnetic domains at the end portion of the laser scanning width.

As described above, in the laser magnetic domain control method in the related art, there is a problem that an effect of controlling magnetic domains over the entire laser scanning width (core loss reduction effect) is insufficiently obtained.

In order to solve this problem, increasing the absorptance of the laser beam at the end portion of the laser scanning width may be considered. For example, Patent Documents 4 and 5 mentioned above disclose a technology in which the incident angle of a laser beam (linearly polarized light) is fixed to an angle close to the Brewster's angle (for example, an angle of 45° or higher, referring to Claim 3 in Patent Document 4 and Claim 1 in Patent Document 5) such that the surface of a processing object is irradiated with the laser beam in a state in which the absorptance of the laser beam is always maximized.

However, although the technology disclosed in Patent Documents 4 and 5 is effective in a system in which the incident angle of the laser beam can be fixed, it is difficult to apply the technology to a system in which a laser beam is scanned onto a processing object over a predetermined laser scanning width as in the system used for the laser magnetic domain control method in the related art described above (in other words, a system in which the incident angle of a laser beam varies).

The present invention has been made taking the foregoing circumstances into consideration, and an object thereof is to provide a laser processing apparatus capable of reducing core loss of a grain-oriented electromagnetic steel sheet over the entire laser scanning width of a laser beam.

Means for Solving the Problem

In order to achieve the object by solving the problems, the present invention employs the following measures.

(1) An aspect of the present invention provides a laser processing apparatus for refining magnetic domains of a grain-oriented electromagnetic steel sheet by setting a laser beam to be focused on the grain-oriented electromagnetic steel sheet and scanned in a scanning direction, in which the laser beam focused on the grain-oriented electromagnetic steel sheet is linearly polarized light, and an angle between a linear polarization direction and the scanning direction is equal to or higher than 0° and lower than 45°.

(2) In the laser processing apparatus described in (1), a maximum incident angle $\phi_{MAX}$ of the laser beam incident on the grain-oriented electromagnetic steel sheet may satisfy the following conditional expression (1).

$$1/\cos \phi_{MAX} \leq 1.24 \quad (1)$$

(3) In the laser processing apparatus described in (1) or (2), a wavelength of the laser beam focused on the grain-oriented electromagnetic steel sheet may be 0.15 μm or higher and 7 μm or lower.

(4) The laser processing apparatus described in any one of (1) to (3) may further include: a laser oscillator which emits the laser beam; and a polarizer which converts the laser beam emitted by the laser oscillator into the linearly polarized light.

(5) In the laser processing apparatus described in (4), the laser oscillator may be a fiber laser or a disk laser.

(6) In the laser processing apparatus described in any one of (1) to (5), a shape of the laser beam focused on the grain-oriented electromagnetic steel sheet is an ellipse, and a minor axis direction of the ellipse is perpendicular to the scanning direction.

Effects of the Invention

According to the aspect, the core loss of the grain-oriented electromagnetic steel sheet can be reduced over the entire laser scanning width of the laser beam.

EMBODIMENT OF THE INVENTION

Figure 1:
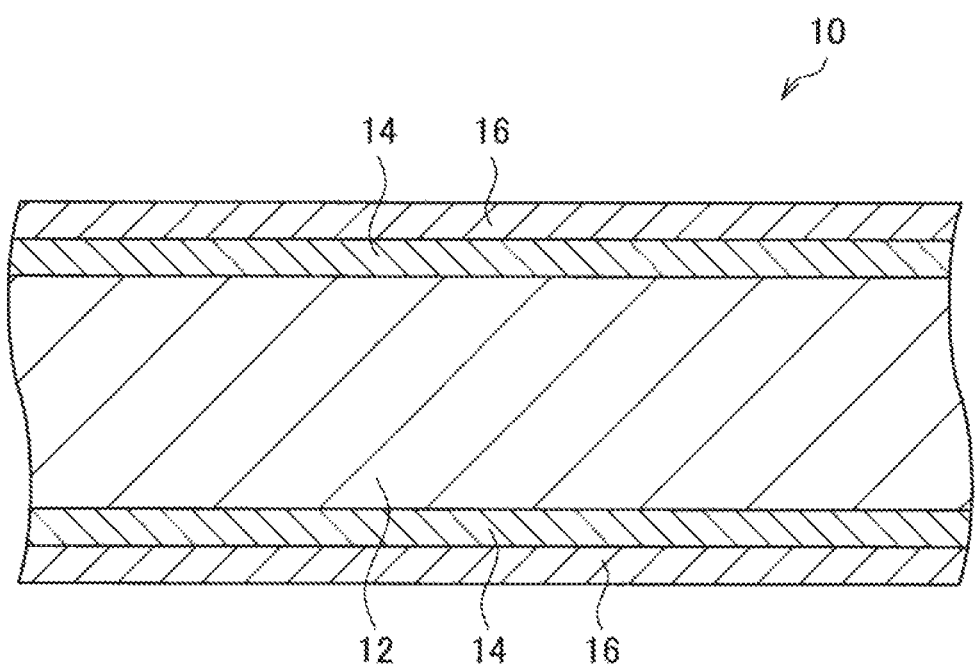
FIG. 1 is a sectional view of a grain-oriented electromagnetic steel sheet 10 according to an embodiment of the present invention.

An embodiment of the present invention will be described in detail below with reference to the accompanying drawings. In the specification and the drawings, elements which have substantially the same functional configuration are denoted by the same reference numerals, and corresponding descriptions will not be repeated.

<Summary of Grain-Oriented Electromagnetic Steel Sheet>

A grain-oriented electromagnetic steel sheet is an electromagnetic steel sheet in which the easy magnetization axis of grains of the steel sheet (<001> direction of a body-centered cubic crystal) is substantially aligned with the rolling direction in a production process. In the grain-oriented electromagnetic steel sheet described above, a number of magnetic domains of which the magnetization direction aligns with the rolling direction are arranged and these magnetic domains are separated by domain walls. The grain-oriented electromagnetic steel sheet is easily magnetized in the rolling direction and is thus appropriate as the core material of a transformer in which the directions of lines of magnetic forces are substantially constant.

A core for a transformer is roughly classified into a wound core and a stacked core. In a production process of a wound core, a steel sheet is assembled into the shape of the core while winding deformation is given thereto, and thereafter annealing is performed on the resultant in order to remove strains introduced due to the mechanical deformation. However, in the annealing process, as described above, strains introduced due to laser irradiation are also removed, and thus the effect of refining the magnetic domains is lost. On the other hand, in a production process of a stacked core, an annealing process for strain removal described above is unnecessary. Therefore, the grain-oriented electromagnetic steel sheet according to this embodiment is particularly appropriate as the material of stacked cores.

FIG. 1 is a sectional view of a grain-oriented electromagnetic steel sheet 10 according to this embodiment. As shown in FIG. 1, the grain-oriented electromagnetic steel sheet 10 includes a steel sheet body (base steel material) 12, glass coating films 14 formed on both surfaces of the steel sheet body 12, and insulating coating films 16 formed on the glass coating films 14.

The steel sheet body 12 is formed of an iron alloy containing Si. The composition of the steel sheet body 12 includes, as an example, Si: 2.5 mass % or more and 4.0 mass % or less, C: 0.02 mass % or more and 0.10 mass % or less, Mn: 0.05 mass % or more and 0.20 mass % or less, acid-soluble Al: 0.020 mass % or more and 0.040 mass % or less, N: 0.002 mass % or more and 0.012 mass % or less, S: 0.001 mass % or more and 0.010 mass % or less, P: 0.01 mass % or more and 0.04 mass % or less, and Fe and unavoidable impurities as the remainder. For example, the thickness of the steel sheet body 12 is 0.1 mm or greater and 0.4 mm or smaller.

For example, the glass coating film 14 is formed of complex oxides such as forsterite ($Mg_2SiO_4$), spinel ($MgAl_2O_4$), and cordierite ($Mg_2Al_4Si_5O_{16}$). For example, the thickness of the glass coating film 14 is 1 µm.

For example, the insulating coating film 16 is formed of a coating liquid primarily containing colloidal silica and phosphate (magnesium phosphate, aluminum phosphate, or the like), or a coating liquid in which alumina sol and boric acid are mixed together. For example, the thickness of the insulating coating film 16 is 2 µm or greater and 3 µm or smaller.

In the grain-oriented electromagnetic steel sheet 10 having the above-described configuration, a laser beam is emitted toward the upper side of the insulating coating film 16 such that residual strains are given to line-shaped regions substantially perpendicular to the rolling direction. The line-shaped regions to which the residual strains are given are formed at predetermined periods in the rolling direction. In regions which exist between two line-shaped regions and are magnetized in the rolling direction, magnetic domain widths in a direction substantially perpendicular to the rolling direction are refined.

<Production Method of Grain-Oriented Electromagnetic Steel Sheet>

Figure 2:
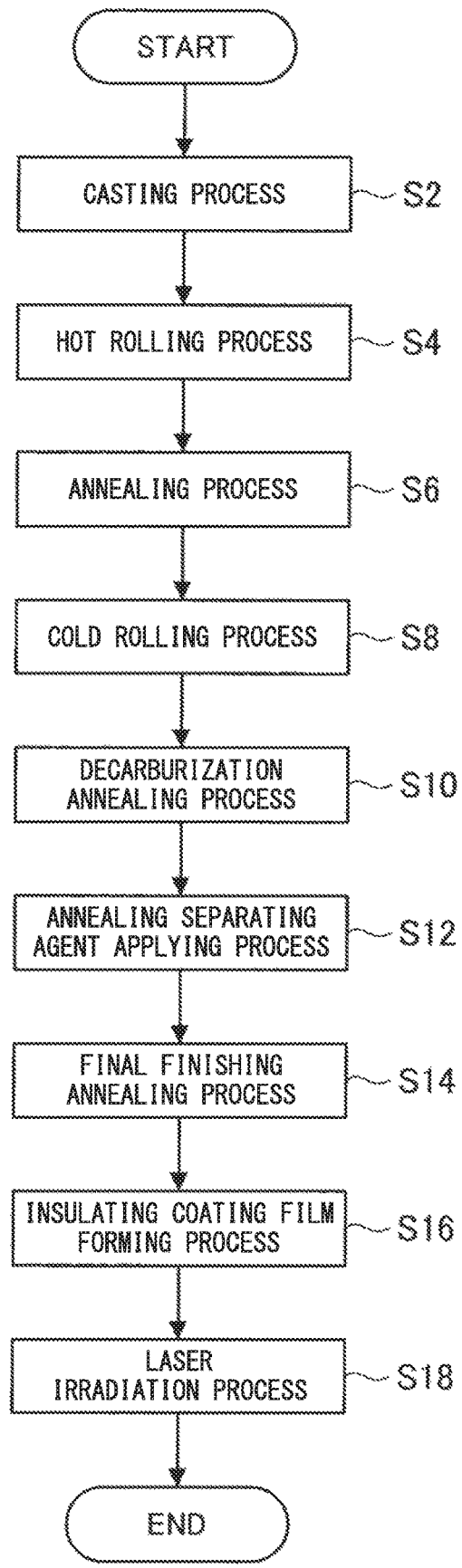
FIG. 2 is a flowchart showing an example of a production process of the grain-oriented electromagnetic steel sheet 10 according to an embodiment of the present invention.

A production method of the grain-oriented electromagnetic steel sheet 10 according to this embodiment will be described with reference to FIG. 2. FIG. 2 is a flowchart showing an example of a production process of the grain-oriented electromagnetic steel sheet 10 according to this embodiment.

As shown in FIG. 2, the production process of the grain-oriented electromagnetic steel sheet 10 includes a casting process S2, a hot rolling process S4, an annealing process S6, a cold rolling process S8, a decarburization annealing process S10, an annealing separating agent applying process S12, a final finishing annealing process S14, an insulating coating film forming process S16, and a laser irradiation process S18.

In the casting process S2, molten steel which is adjusted to have a predetermined composition is supplied to a continuous casting machine to continuously form an ingot. In the hot rolling process S4, hot rolling is performed by heating the ingot to a predetermined temperature (for example, 150° C. to 1400° C.). Accordingly, a hot rolled material having a predetermined thickness (for example, 1.8 to 3.5 mm) is formed.

In the annealing process S6, a heat treatment is performed on the hot rolled material, for example, under the condition of a heating temperature of 750° C. to 1200° C. and a heating time of 30 seconds to 10 minutes. In the cold rolling process S8, the surface of the hot rolled material is pickled, and thereafter cold rolling is performed thereon. Accordingly, a cold rolled material having a predetermined thickness (for example, 0.1 to 0.4 mm) is formed.

In the decarburization annealing process S10, a heat treatment is performed on the cold rolled material, for example, under the condition of a heating temperature of 700° C. to 900° C. and a heating time of 1 to 3 minutes, thereby forming the steel sheet body 12. An oxide film primarily containing silica ($SiO_2$) is formed on the surface of the steel sheet body 12. In the annealing separating agent applying process S12, an annealing separating agent primarily containing magnesia (MgO) is formed on the oxide layer of the steel sheet body 12.

In the final finishing annealing process S14, the steel sheet body 12 to which the annealing separating agent is applied is inserted into a batch type furnace in a state of being wound in a coil shape and is subjected to a heat treatment. The heat treatment conditions are, for example, a heating temperature of 1100° C. to 1300° C. and a heating time of 20 to 24 hours. At this time, so-called Goss grains of which the easy magnetization axis aligns with a transport direction (rolling direction) of the steel sheet body 12 preferentially grow. As a result, a grain-oriented electromagnetic steel sheet which has a high degree of crystal orientation (orientation) can be obtained after the finishing annealing. In addition, in the final finishing annealing process S4, the oxide layer and the annealing separating agent react with each other and thereby the glass coating film 14 formed of forsterite ($Mg_2SiO_4$) is formed on the surface of the steel sheet body 12.

In the insulating coating film forming process S16, the steel sheet body 12 which is wound in the coil shape is unwound and stretched into a plate shape so as to be transported. Then, an insulating agent is applied onto the glass coating films 14 formed on both surfaces of the steel sheet body 12, and the resultant is baked, thereby forming the coating insulating films 16. The steel sheet body 12 on which the insulating coating films 16 are formed is wound in a coil shape.

In the laser irradiation process S18, the steel sheet body 12 which is wound in the coil shape is unwound and stretched into a plate shape so as to be transported. In addition, a laser beam is focused on and irradiates one surface of the steel sheet body 12 by a laser irradiation device, which will be described later, and the laser beam is scanned substantially along the width direction of the electromagnetic steel sheet transported in the rolling direction (transport direction). Accordingly, line-shaped strains which are substantially perpendicular to the rolling direction are formed on the surface of the steel sheet body 12 at predetermined intervals in the rolling direction. In addition, focusing and scanning of the laser beam may also be performed on both surfaces including the front surface and the rear surface of the steel sheet body 12. In addition, it is described above that the steel sheet body 12 on which the insulating coating films 16 are formed is wound in the coil shape and is then subjected to the laser irradiation process S18. However, laser irradiation may be performed immediately after the formation of the insulating coating films and thereafter the steel sheet body 12 may be wound in a coil shape.

In the production process described above, the grain-oriented electromagnetic steel sheet 10 in which the glass coating films 14 and the insulating coating films 16 are formed on the surface of the steel sheet body 12 and magnetic domains are controlled by laser irradiation is produced.

<Configuration of Laser Processing Apparatus>

Figure 3:
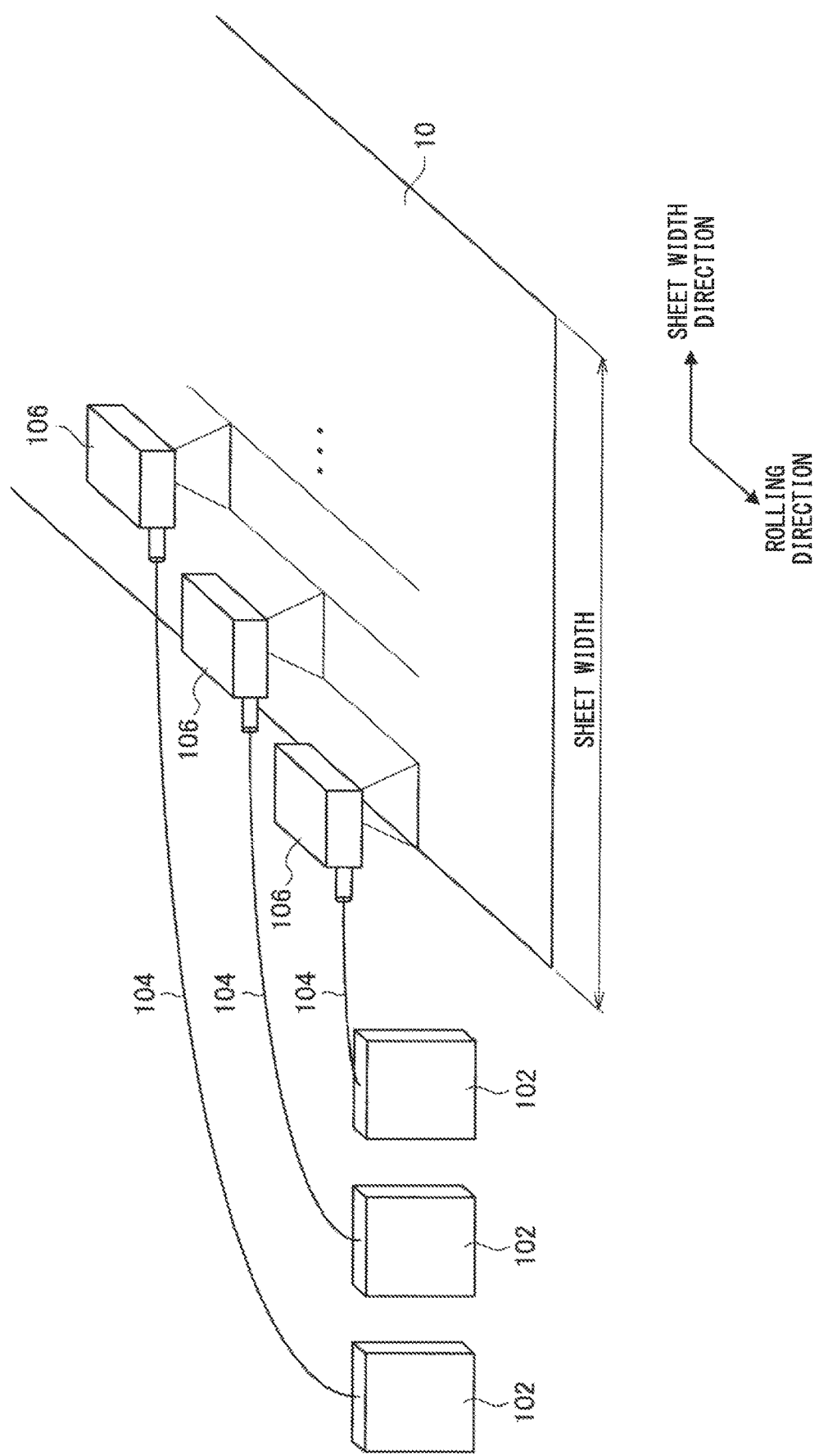
FIG. 3 is a schematic view showing an example of a configuration of a laser processing apparatus 100 according to an embodiment of the present invention.
Figure 4:
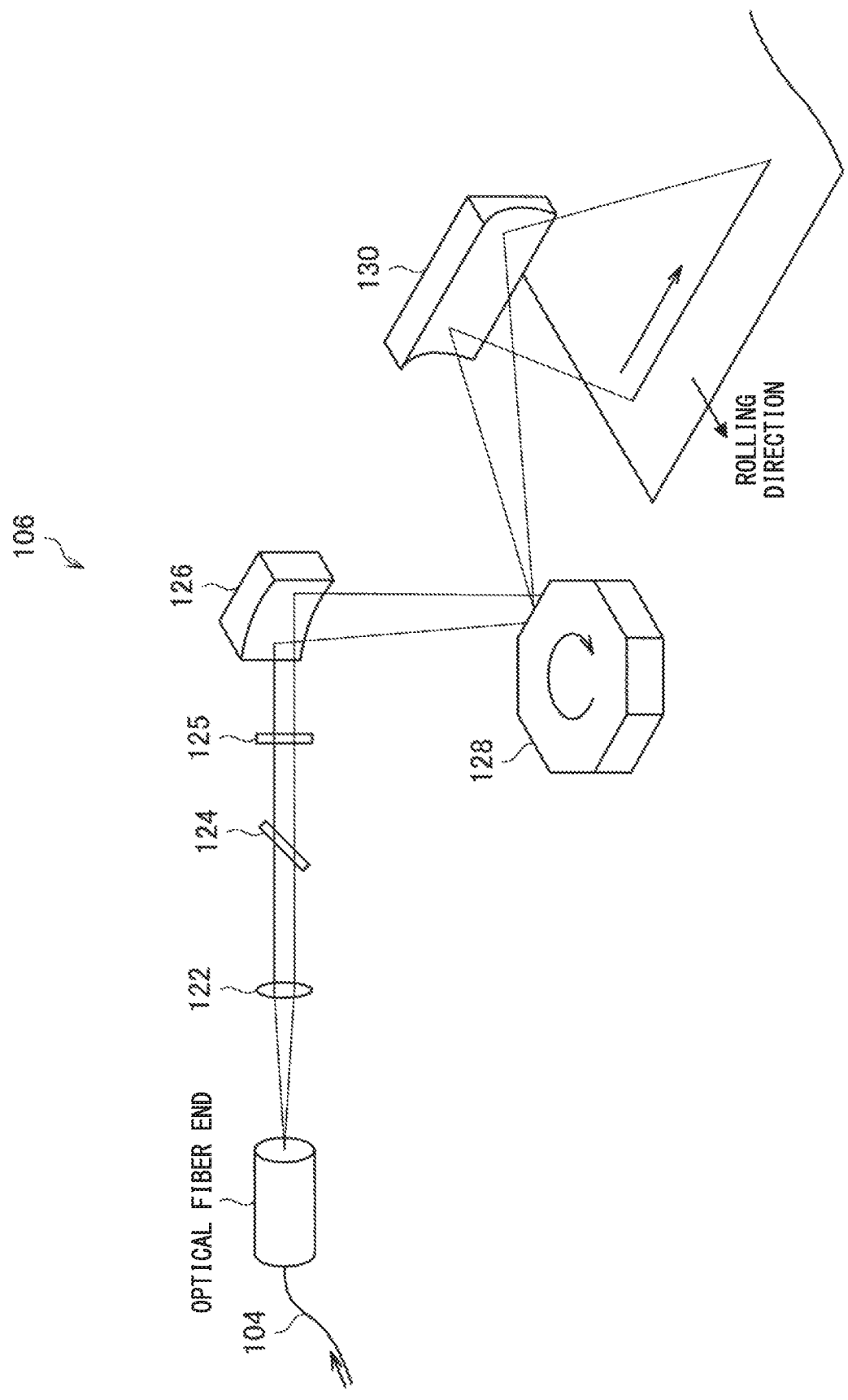
FIG. 4 is a schematic view showing an example of a configuration of a laser irradiation device 106 according to an embodiment of the present invention.

An example of the configuration of a laser processing apparatus 100 which irradiates the grain-oriented electromagnetic steel sheet 10 with a laser beam to generate residual strains will be described with reference to FIGS. 3 and 4. FIG. 3 is a schematic view showing the example of the configuration of the laser processing apparatus 100 according to this embodiment. FIG. 4 is a schematic view showing an example of the configuration of a single laser irradiation device 106.

The laser processing apparatus 100 emits the laser beam toward the upper side of the insulating coating film 16 of the grain-oriented electromagnetic steel sheet 10, which is transported in the rolling direction at a predetermined speed, in order to generate line-shaped strains substantially perpendicular to the rolling direction. As shown in FIG. 3, the laser processing apparatus 100 includes a number of laser oscillators 102, a number of transmission fibers 104, and a number of the laser irradiation devices 106. In FIG. 3, three laser oscillators 102, three transmission fibers 104, and three laser irradiation devices 106 are shown, and the configurations of the three are the same.

For example, the laser oscillator 102 emits a laser beam with an output of 100 W or more. For example, the laser oscillator 102 emits a laser beam at a wavelength of 0.15 μm or higher and 7 μm or lower. The transmission fiber 104 is an optical fiber which transmits the laser beam emitted from the laser oscillator 102 to the laser irradiation device 106.

As the type of the laser oscillator 102, a fiber laser or a disk laser is preferable because it allows a very small beam spot size by its excellent focusing characteristics and enables to form narrow circulating current magnetic domains. A fiber laser or disk laser has a wavelength in a region from the near-ultraviolet region to the near-infrared region (for example, 1 μm band) and thus can be transmitted through an optical fiber. Since the laser beam can be transmitted through an optical fiber, the laser processing apparatus 100 which is relatively compact can be realized. The laser oscillator 102 may be either a continuous wave laser or a pulsed laser.

The laser irradiation device 106 allows the laser beam transmitted from the laser oscillator 102 to the transmission fiber 104 to be focused on the grain-oriented electromagnetic steel sheet 10 such that the laser beam is scanned on the grain-oriented electromagnetic steel sheet 10 along a direction substantially perpendicular to the rolling direction. A width which is scanned with the laser beam by a single laser irradiation device 106 may be smaller than the sheet width of the grain-oriented electromagnetic steel sheet 10. However, as shown in FIG. 3, by arranging a number of laser irradiation devices 106 in the sheet width direction, the region of the overall sheet width of the grain-oriented electromagnetic steel sheet 10 can be scanned with the laser beams.

As shown in FIG. 4, the laser irradiation device 106 includes a collimator lens 122, a polarizing beam splitter 124 as an example of a polarizer, a λ/2 plate 125, a metallic mirror 126, a polygon mirror 128, and a parabolic mirror 130.

The collimator lens 122 converts the laser beam transmitted from the transmission fiber 104 into collimated light. The laser beam as the collimated light is an unpolarized beam in the description and is incident on the polarizing beam splitter 124.

The polarizing beam splitter 124 converts the incident unpolarized beam into linearly polarized light. When the λ/2 plate 125 is provided behind the polarizing beam splitter 124, the linear polarization direction can be adjusted by changing the rotational angle of the λ/2 plate 125. In addition, by arranging the polarizing beam splitter 124 to rotate around the center axis of the laser beam, the linear polarization direction can be adjusted without the λ/2 plate 125. As an element for changing the polarization direction, a Faraday rotator or the like may be used instead of the λ/2 plate 125. The reason that the laser beam is linearly polarized will be described later. In a case where the laser oscillator 102 which originally oscillates a linearly polarized laser beam (for example, a disk laser, a polarization-maintaining fiber laser, a slab $CO_2$ laser, or lasers provided with a polarized light regulation element in a resonator) is used, for example, an optical element for converting polarization into linearly polarized light, such as the polarizing beam splitter 124 shown in FIG. 4, may be omitted. Furthermore, in a case where the linear polarization direction on the steel sheet follows a predetermined direction, which will be described later, the λ/2 plate 125 may be omitted.

A laser light having an electric field component (linearly polarized component) that oscillates only in one direction is ideal for the linearly polarized laser in the present invention. Strictly speaking, an electric field component that is perpendicular to the linearly polarized component (orthogonal component) exists very slightly. The ratio between the power of the linearly polarized component and the power of the orthogonal component is dependent on the performance of the polarizing beam splitter 124 described above and the performance of the laser oscillator 102. When the power of the linearly polarized component is given by PW1, the power of the orthogonal component is given by PW2, and (PW1/(PW1+PW2)) is defined as a degree of polarization, the linearly polarized light in the present invention has a degree of polarization of 0.9 or higher and lower than 1.0. That is, in a case where a linearly polarized laser having a degree of polarization of 0.9 or higher and lower than 1.0 (90% or higher and lower than 100%) was used, the results of Examples, which will be described later, were obtained. In addition, by splitting the linearly polarized light using an orthogonal prism or the like, the proportions of the linearly polarized components can be analyzed.

The metallic mirror 126 is a mirror that squeezes and adjusts the beam diameter of the incident laser beam in the sheet width direction (see FIG. 5) of the grain-oriented electromagnetic steel sheet 10. As the metallic mirror 126, for example, a cylindrical mirror or a parabolic mirror having a curvature in a uniaxial direction may be used. The laser beam reflected by the metallic mirror 126 is incident on the polygon mirror 128 that rotates at a predetermined rotational speed.

The polygon mirror 128 is a rotatable polyhedron and scans the laser beam on the grain-oriented electromagnetic steel sheet 10 along the sheet width direction thereof as the polygon mirror 128 rotates. While the laser beam is incident on one side of the polyhedron of the polygon mirror 128, a single line-shaped region on the grain-oriented electromagnetic steel sheet 10 along the sheet width direction is scanned with the laser beam as the side rotates such that a residual strain is generated to the line-shaped region. As the polygon mirror rotates, scanning of the laser beam is repeatedly performed, and the grain-oriented electromagnetic steel sheet 10 is simultaneously transported in the rolling direction. As a result, a region having a line-shaped residual strain is periodically formed on the grain-oriented electromagnetic steel sheet 10 in the rolling direction. The period of the line-shaped regions along the rolling direction is adjusted by the transportation speed of the grain-oriented electromagnetic steel sheet 10 and the rotational speed of the polygon mirror 128.

The parabolic mirror 130 is a mirror that squeezes and adjusts the beam diameter of the laser beam reflected by the polygon mirror 128 in the rolling direction. The laser beam reflected by the parabolic mirror 130 is focused on the surface of the grain-oriented electromagnetic steel sheet 10.

Figure 5:
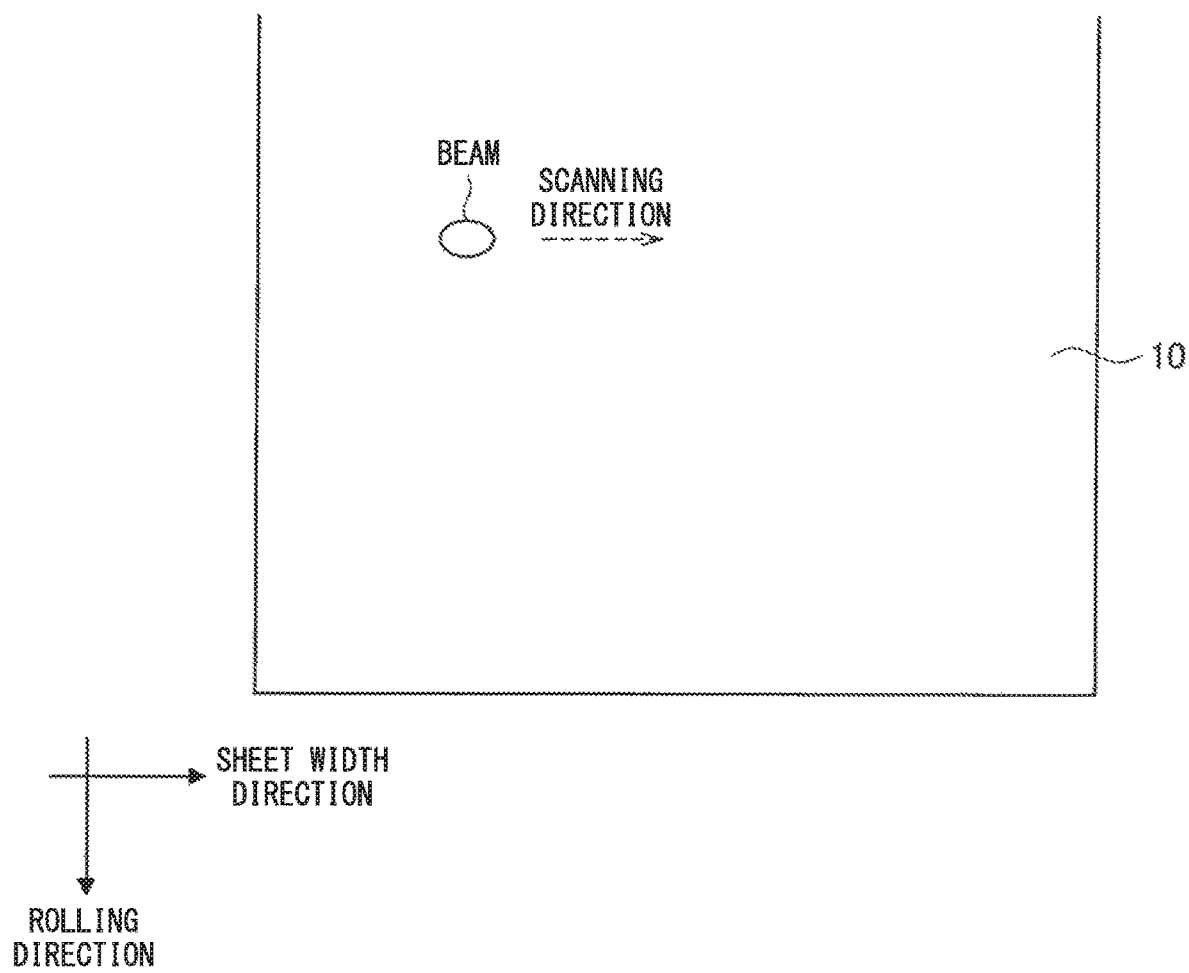
FIG. 5 is a view showing a shape of a laser beam focused on the grain-oriented electromagnetic steel sheet 10.

FIG. 5 is a view showing the shape of the laser beam focused on the grain-oriented electromagnetic steel sheet 10. In this embodiment, the shape of the focused laser beam is an ellipse as shown in FIG. 5. The major axis direction of the ellipse is parallel to the scanning direction of the laser beam, and the minor axis direction of the ellipse is perpendicular to the scanning direction. In other words, the minor axis direction of the ellipse is parallel to the rolling direction. By setting the shape of the focused laser beam to be the ellipse, the time for irradiating one point on the grain-oriented electromagnetic steel sheet 10 with the laser beam increases. As a result, the temperature of the grain-oriented electromagnetic steel sheet 10 can be increased toward a deep position of the inside thereof, which is effective in reducing core loss. Since the beam diameter in the sheet width direction (scanning direction) is squeezed by the metallic mirror 126 and the beam diameter in the rolling direction is squeezed by the parabolic mirror 130, the shape of the focused laser beam becomes an ellipse. In addition, when the shape of the focused laser beam is the ellipse, the area of the focused laser beam increases compared to a case where the focused shape is a true circle, resulting in a reduction in power density. As a result, a temperature gradient along the thickness direction in the vicinity of the surface of the grain-oriented electromagnetic steel sheet 10 is prevented from becoming steep, which is effective in suppressing the generation of defects in the glass coating film 14.

In the above description, a case where the shape of the laser beam focused on the grain-oriented electromagnetic steel sheet 10 is an ellipse is an example, but the present invention is not limited thereto. For example, the shape of the focused laser beam may also be a true circle.

In this embodiment, it is preferable that the intensity distribution of the laser beam be set such that the beam diameter (a width including 86% of the integrated intensity) in the rolling direction becomes 200 μm or smaller. Accordingly, narrower circulating current magnetic domains are formed while further limiting the expansion of thermal conduction in the rolling direction, thereby significantly reducing core loss. Furthermore, in order to reliably reduce core loss, it is more preferable that the beam diameter be set to 120 μm or smaller.

<Incident State of Laser Beam on Laser Scanning Width>

When the laser irradiation device 106 scans the surface of the grain-oriented electromagnetic steel sheet 10 with the laser beam over a predetermined laser scanning width, the states of the laser beam incident on the surface of the grain-oriented electromagnetic steel sheet 10 at the center portion and the end portion of the laser scanning width are different from each other.

Figure 6:
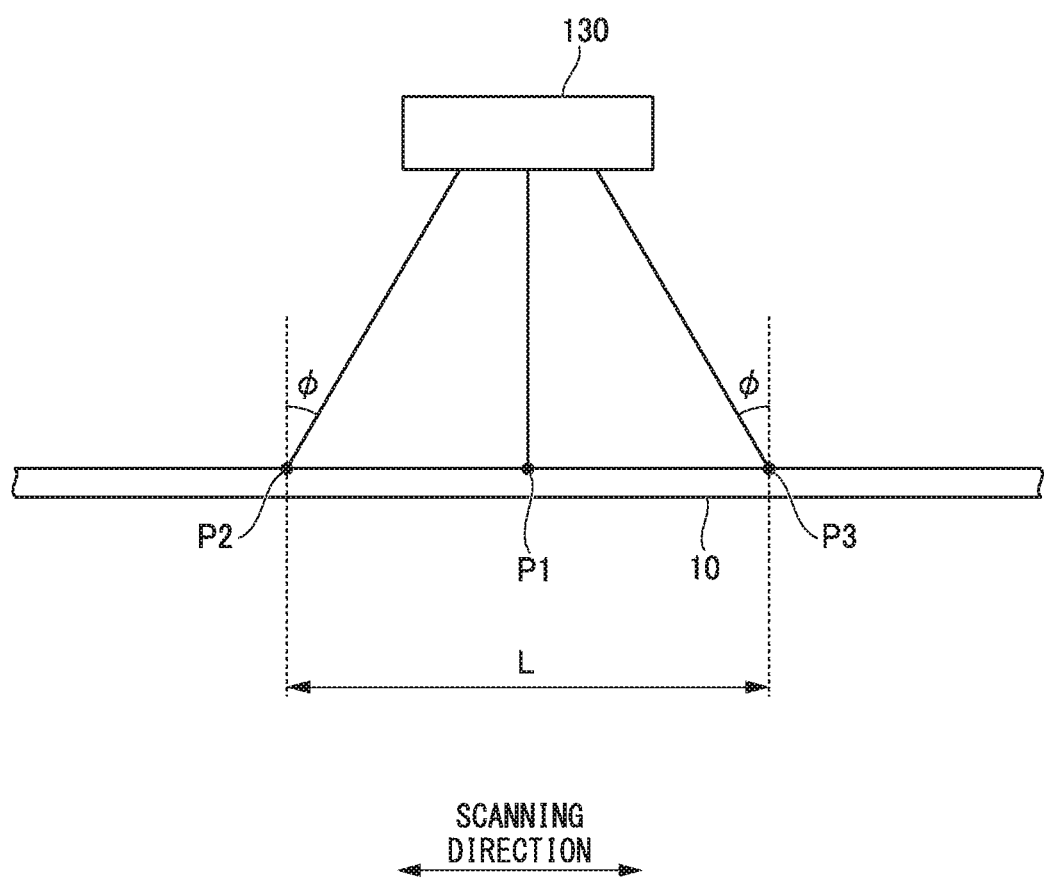
FIG. 6 is a schematic view showing states of the laser beam incident on the grain-oriented electromagnetic steel sheet 10.

FIG. 6 is a schematic view showing the state of the laser beam incident on the grain-oriented electromagnetic steel sheet 10. When the laser irradiation device 106 scans the laser beam over a predetermined laser scanning width L in the scanning direction, as shown in FIG. 6, the state of the laser beam incident on a center portion P1 of the laser scanning width L is different from the state of the laser beam incident on end portions P2 and P3 of the laser scanning width L. Specifically, the laser beam reflected by the parabolic mirror 130 of the laser irradiation device 106 is incident perpendicular to the surface (insulating coating film 16) of the grain-oriented electromagnetic steel sheet 10 at the center portion P1 of the laser scanning width L. On the other hand, the laser beam is obliquely incident on the surface of the grain-oriented electromagnetic steel sheet 10 (incident at an incident angle ϕ with respect to the direction normal to the surface) at both the end portions P2 and P3 of the laser scanning width L.

That is, in a case where the incident position of the laser beam is coincident with the center portion P1 of the laser scanning width L, the angle between the direction perpendicular to (direction normal to) the surface of the grain-oriented electromagnetic steel sheet 10 and the propagation direction of the laser beam (the incident angle ϕ of the laser beam) becomes 0°. On the other hand, as the incident position of the laser beam approaches the end portion P2 or P3 of the laser scanning width L, the incident angle ϕ of the laser beam increases.

Figure 7:
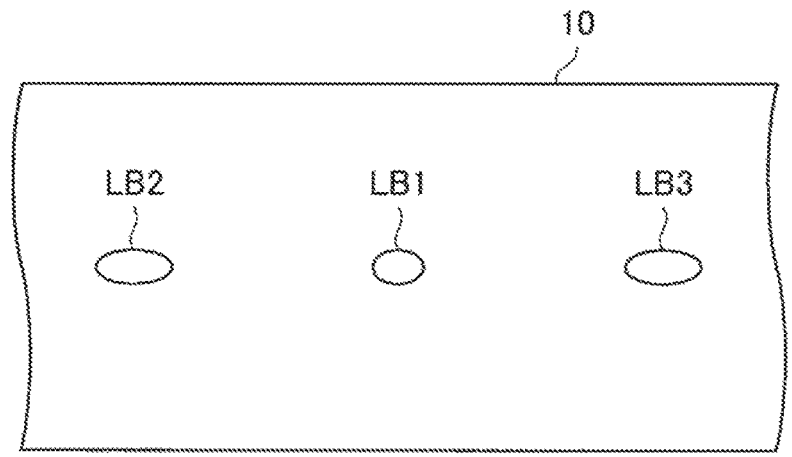
FIG. 7 is a schematic view showing beam diameters of the laser beam on the grain-oriented electromagnetic steel sheet 10.
Figure 7:
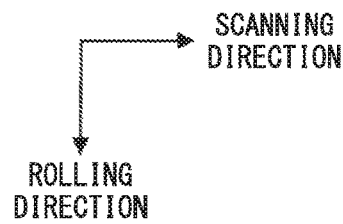

FIG. 7 is a schematic view showing beam diameters of the laser beam on the grain-oriented electromagnetic steel sheet 10. In FIG. 7, reference numeral LB1 denotes a laser beam focused on the center portion P1 of the laser scanning width L. Reference numeral LB2 denotes a laser beam focused on one end portion P2 of the laser scanning width L. Reference numeral LB3 denotes a laser beam focused on the other end portion P3 of the laser scanning width L. Since the laser beams are obliquely incident on the end portions P2 and P3 of the laser scanning width L, the beam diameters of the laser beams LB2 and LB3 in the scanning direction (the length of the major axis of an elliptical beam in the scanning direction) are greater than the beam diameter of the laser beam LB1 of the center portion P1. In addition, since the laser beams are obliquely incident on the end portions P2 and P3 of the laser scanning width L, the distance from the parabolic mirror 130 to an irradiation point on the steel sheet increases. As a result, the beam diameters of the laser beams LB2 and LB3 in the rolling direction (the length of the minor axis of the elliptical beam along the rolling direction) are greater than the beam diameter of the laser beam LB1 of the center portion P1.

As described above, as the beam diameter increases, the area irradiated with the laser beam increases, and thus the power density of the laser beam decreases. As a result, the temperature gradient along the thickness direction at the end portions P2 and P3 of the laser scanning width L becomes smaller than the temperature gradient at the center portion P1, and thus magnetic domains at the end portions P2 and P3 cannot be appropriately refined.

Figure 8:
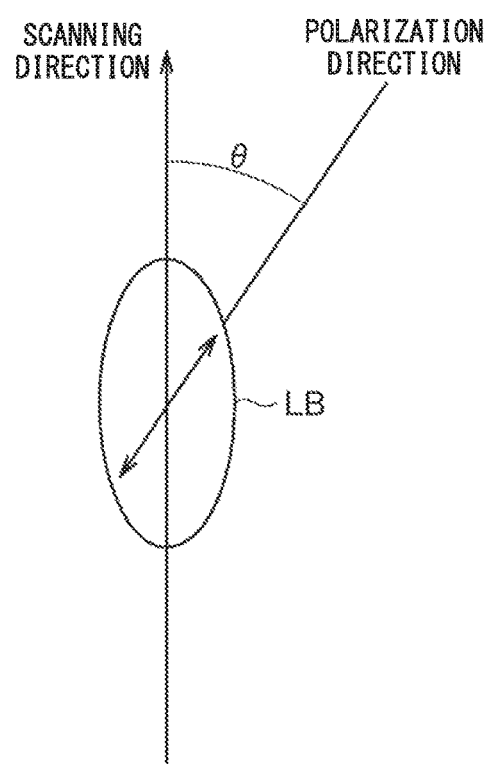
FIG. 8 is a schematic view showing the relationship between a linear polarization direction and a scanning direction of the laser beam.

In this embodiment, in order to solve this problem, the laser beam focused on the surface (the insulating coating film 16) of the grain-oriented electromagnetic steel sheet 10 is set to be linearly polarized light, and as shown in FIG. 8, and the angle θ between the linear polarization direction and the scanning direction of the laser beam is set to be equal to or higher than 0° and lower than 45°. FIG. 8 is a schematic view showing the relationship between the linear polarization direction and the scanning direction of the laser beam in a case where the incident angle φ of the laser beam is 0°. As far as the angle θ between the scanning direction of the laser beam and the linear polarization direction is equal to or higher than 0° and lower than 45°, the relationship between the linear polarization direction and the scanning direction of the laser beam may have a reflectional symmetry with respect to FIG. 8.

As in this embodiment, in a case where the angle θ is set to be equal to or higher than 0° and lower than 45°, as described later, the absorptance of the laser beam at the end portions P2 and P3 of the laser scanning width L can be increased. Therefore, even when the beam diameter of the laser beam at the end portions P2 and P3 increases, a reduction in the power density absorbed by the steel sheet can be limited. Accordingly, a reduction in the temperature gradient along the thickness direction at the end portions P2 and P3 of the laser scanning width L can be limited, and the difference in temperature gradient from the center portion P1 can be reduced. As a result, core loss can be uniformly reduced over the entire laser scanning width L.

<Relationship Between Linearly Polarized Light and Absorptance>

Here, the principle that the absorptance of the laser beam is increased, depending on the angle θ between the linear polarization direction and the scanning direction of the laser beam, is described.

A portion of the laser beam incident on the grain-oriented electromagnetic steel sheet 10 is reflected by the insulating coating film 16, and the remainder is incident on the insulating coating film 16. A portion of the laser beam incident on the insulating coating film 16 is absorbed inside the insulating coating film 16 and the remainder reaches the upper surface of the glass coating film 14 such that a portion thereof is reflected and the remainder thereof is incident on the glass coating film 14. A portion of the laser beam incident on the glass coating film 14 is absorbed inside the glass coating film 14 and the remainder reaches the upper surface of the steel sheet body (hereinafter, also called base steel material) 12 such that a portion thereof is reflected and the remainder thereof is absorbed by the surface of the steel sheet body 12. In addition, the power of the laser beam transmitted to the grain-oriented electromagnetic steel sheet 10 is dependent on the absorptance of the laser beam absorbed by the insulating coating film 16 and the like as described above. When the absorptance of the laser beam at the insulating coating film 16 and the like is high, the power of the laser beam transmitted to the grain-oriented electromagnetic steel sheet 10 increases.

Linearly polarized light generally includes P-polarized light (also called P waves) and S-polarized light (also called S waves). It is known that the absorptance of P-polarized light and the absorptance of S-polarized light are different from each other. Therefore, depending on the absorptances of the P-polarized light and the S-polarized light into the insulating coating film 16 and the like, the power of the laser beam transmitted to the grain-oriented electromagnetic steel sheet 10 varies.

Figure 9A:
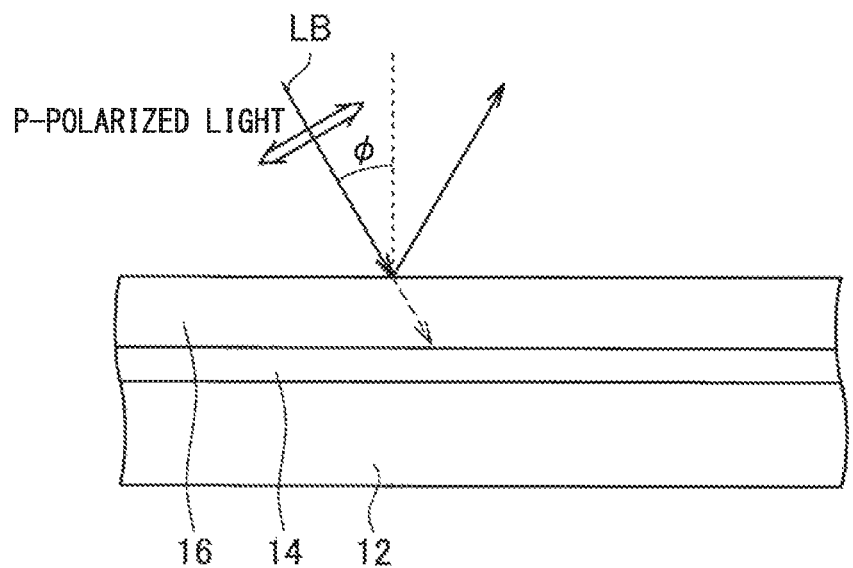
FIG. 9A is a view showing an electric field oscillation direction of P-polarized light in a case where linearly polarized light LB is incident on the surface of the grain-oriented electromagnetic steel sheet 10 at an incident angle $\phi$.
Figure 9B:
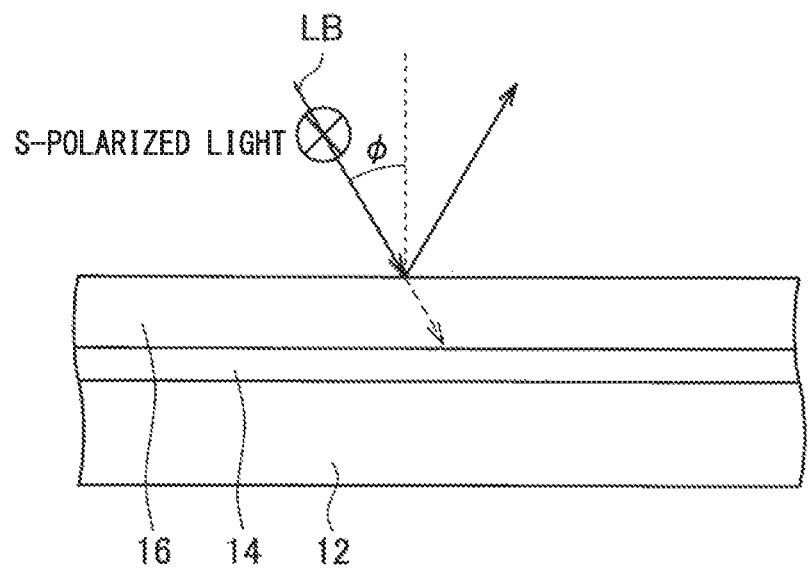
FIG. 9B is a view showing an electric field oscillation direction of S-polarized light in the case where the linearly polarized light LB is incident on the surface of the grain-oriented electromagnetic steel sheet 10 at the incident angle $\phi$.

FIG. 9A shows an electric field oscillation direction of P-polarized light in a case where linearly polarized light LB is incident on the surface of the grain-oriented electromagnetic steel sheet 10 at an incident angle φ. FIG. 9B shows an electric field oscillation direction of S-polarized light in a case where the linearly polarized light LB is incident on the surface of the grain-oriented electromagnetic steel sheet 10 at the incident angle φ. As shown in FIGS. 9A and 9B, in the case where the linearly polarized light LB is incident on the surface of the grain-oriented electromagnetic steel sheet 10 at the incident angle φ, the electric field oscillation direction of the P-polarized light and the electric field oscillation direction of the S-polarized light are different from each other. Specifically, during scanning the linearly polarized light, the electric field of the P-polarized light oscillates along the double arrow direction shown in FIG. 9A, and the electric field of the S-polarized light oscillates along the direction perpendicular to the figure as shown in FIG. 9B.

Figure 10:
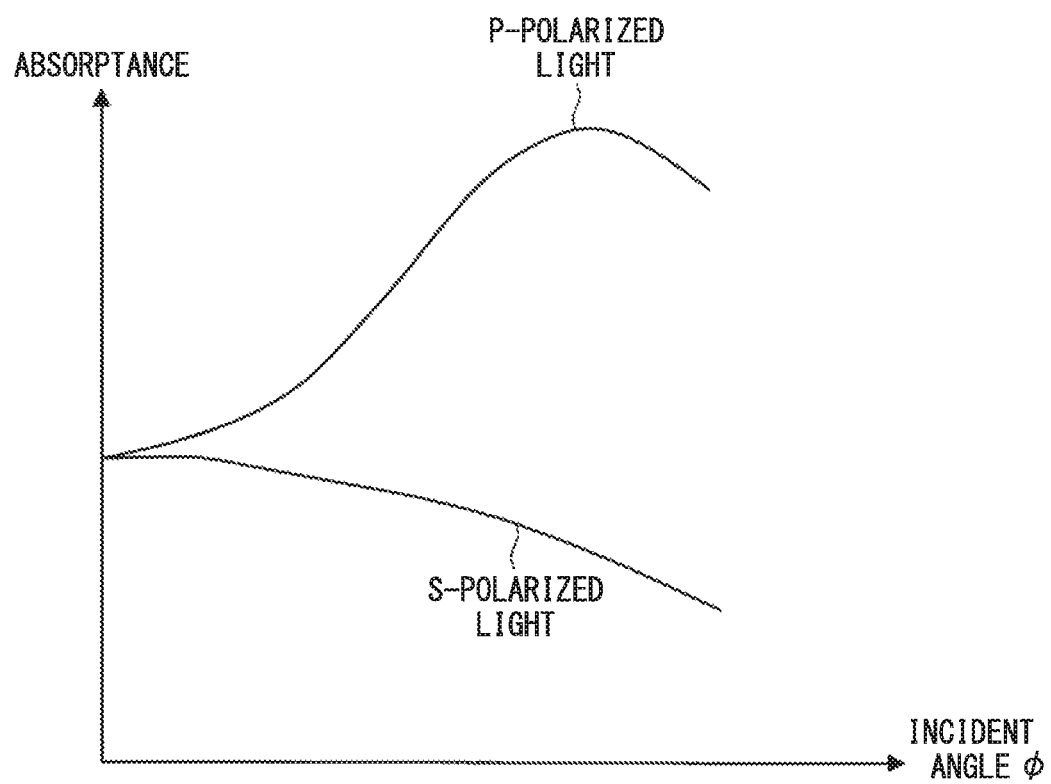
FIG. 10 is a graph showing the absorptances of P-polarized light and S-polarized light of the laser beam at the upper surface of a base steel material 12.

FIG. 10 is a graph showing the absorptances of the P-polarized light and the S-polarized light of the laser beam at the upper surface of the base steel material 12. As shown in FIG. 10, the absorptance of the P-polarized light is higher than the absorptance of the S-polarized light. In addition, as the incident angle φ of the laser beam (linearly polarized light) increases, the absorptance of the P-polarized light increases, and the absorptance of the S-polarized light decreases. FIG. 10 shows the absorptances at the upper surface of the base steel material 12, which remains after removal of the insulating coating film 16 and the glass coating film 14 from the grain-oriented electromagnetic steel sheet 10. However, the absorptance at the upper surface of the insulating coating film 16 and the absorptance at the upper surface of the glass coating film 14 have the same tendency as that of FIG. 10.

In a case where the angle θ between the linear polarization direction and the scanning direction of the laser beam is 0°, only the P-polarized light is incident on an incident surface (the surface of the grain-oriented electromagnetic steel sheet 10). In a case where the angle θ is 45°, the P-polarized light and the S-polarized light are incident on the incident surface one half for each. In a case where the angle θ is 900, only the S-polarized light is incident on the incident surface. Therefore, in a case where the angle θ is equal to or higher than 00 and lower than 45°, the effect of the P-polarized light between the P-polarized light and the S-polarized light becomes dominant, and as the incident angle φ increases, the absorptance of the laser beam increases. On the other hand, in a case where angle θ is higher than 45° and equal to or lower than 90°, the effect of the S-polarized light becomes dominant, and as the incident angle φ increases, the absorptance of the laser beam decreases.

In this embodiment, for increasing the absorptance of the laser beam at the end portions P2 and P3 of the laser scanning width L of the laser irradiation device 106, the angle θ between the linear polarization direction and the scanning direction of the laser beam is set to be equal to or higher than 0° and lower than 450. Accordingly, the power of the laser beam transmitted to the insulating coating film 16 and the like at the end portions P2 and P3 of the laser scanning width L can be increased. Therefore, even though the beam diameter at the end portions P2 and P3 of the laser scanning width L increases, a reduction in the power density of the laser beam at the end portions P2 and P3 can be limited. As a result, a reduction in the temperature gradient along the thickness direction at the end portions P2 and P3 of the laser scanning width L can be limited, and thus the difference in temperature gradient from the center portion P1 can be reduced.

Particularly, in a case where the angle θ between the linear polarization direction and the scanning direction of the laser beam is set to 0° or higher and 20° or lower, a reduction in the power density of the laser beam at the end portions P2 and P3 of the laser scanning width L can be further limited, and thus the temperature gradient along the thickness direction over the entire laser scanning width L can be uniformized.

In addition, in this embodiment, a laser beam having a wavelength of 0.15 μm or higher and 7 μm or lower is particularly effective. In a case where the wavelength of the laser beam is 0.15 μm or higher and 7 μm or lower, the insulating coating film 16 and the glass coating film 14 are transparent to the laser beam, and the laser beam is less likely to be absorbed inside the insulating coating film 16 and the glass coating film 14. In this case, the power of the laser beam transmitted to the grain-oriented electromagnetic steel sheet 10 is determined depending on the absorptance of the laser beam on the upper surface of the insulating coating film 16, the absorptance of the laser beam on the upper surface of the glass coating film 14, and the absorptance of the laser beam on the upper surface of the base steel material 12. That is, the product of the absorptance of the laser beam on the upper surface of the insulating coating film 16, the absorptance of the laser beam on the upper surface of the glass coating film 14, and the absorptance of the laser beam on the upper surface of the base steel material 12 is important. Regarding any of the three absorptances, as shown in FIG. 10, as the angle θ increases, the absorptance of the P-polarized light increases. Due to the multiplicative effect, by setting the angle θ to be equal to or higher than 0° and lower than 45°, absorption of the laser beam by the insulating coating film 16 at the end portions P2 and P3 of the laser scanning width L can be further promoted. As a result, a reduction in the temperature gradient at the end portions P2 and P3 of the laser scanning width L can be limited, and thus the effectiveness of this embodiment can be further reliably exhibited.

In addition, the inventors discovered that when the magnification of a beam diameter respect to a beam diameter (hereinafter, called a reference beam diameter) in a case where the incident angle ϕ of the laser beam is 00 is higher than 24%, as described above, even when the angle θ between the linear polarization direction and the scanning direction is set to be equal to or higher than 00 and lower than 45°, a reduction in the power density of the laser beam at the end portions P2 and P3 of the laser scanning width L cannot be sufficiently limited (in other words, a core loss improvement ratio at the end portions P2 and P3 of the laser scanning width L decreases).

It is thought that this is because when the magnification of the beam diameter with respect to the reference beam diameter is higher than 24%, the amount of a reduction in the power density caused by an increase in the beam diameter cannot be covered by the amount of an increase in the absorptance of the laser beam (linearly polarized light).

Therefore, in order to uniformly and reliably reduce core loss over the entire laser scanning width L, it is preferable that the maximum incident angle $\phi_{MAX}$ of the laser beam be set on the basis of the following conditional expression (1).

$$1/\cos \phi_{MAX} \leq 1.24 \tag{1}$$

In the conditional expression (1), the left side represents the magnification of the beam diameter (the beam diameter at the maximum incident angle $\phi_{MAX}$) with respect to the reference beam diameter. Therefore, using the conditional expression (1), the maximum incident angle $\phi_{MAX}$ at which the magnification with respect to the reference beam diameter is not higher than 24% can be obtained. According to the conditional expression (1), it can be seen that it is preferable that the maximum incident angle $\phi_{MAX}$ be 36° or lower. For example, in the laser irradiation device 106 which uses the polygon mirror 128 shown in FIG. 4, when the number of sides of the polygon mirror 128 is given by N, the maximum incident angle $\phi_{MAX}$ of the laser beam can be expressed by 360°/N. Therefore, it is preferable that in the laser irradiation device 106 shown in FIG. 4, N be 10 or higher.

As described above, Patent Documents 4 and 5 mentioned above disclose a technology in which the incident angle of a laser beam (linearly polarized light) is fixed to an angle close to the Brewster's angle (for example, an angle of 45° or higher) and the surface of a processing object is irradiated with the laser beam in a state in which the absorptance of the laser beam is always maximized. On the contrary, the embodiment of the present invention is significantly different from the technology disclosed in Patent Documents 4 and 5 in that the maximum incident angle $\phi_{MAX}$ of the laser beam is set to be lower than 45° (specifically 36° or lower) and the grain-oriented electromagnetic steel sheet 10 is scanned with the laser beam in a range where ϕ does not exceed the maximum $\phi_{MAX}$ (that is, the laser scanning width L).

Figure 11:
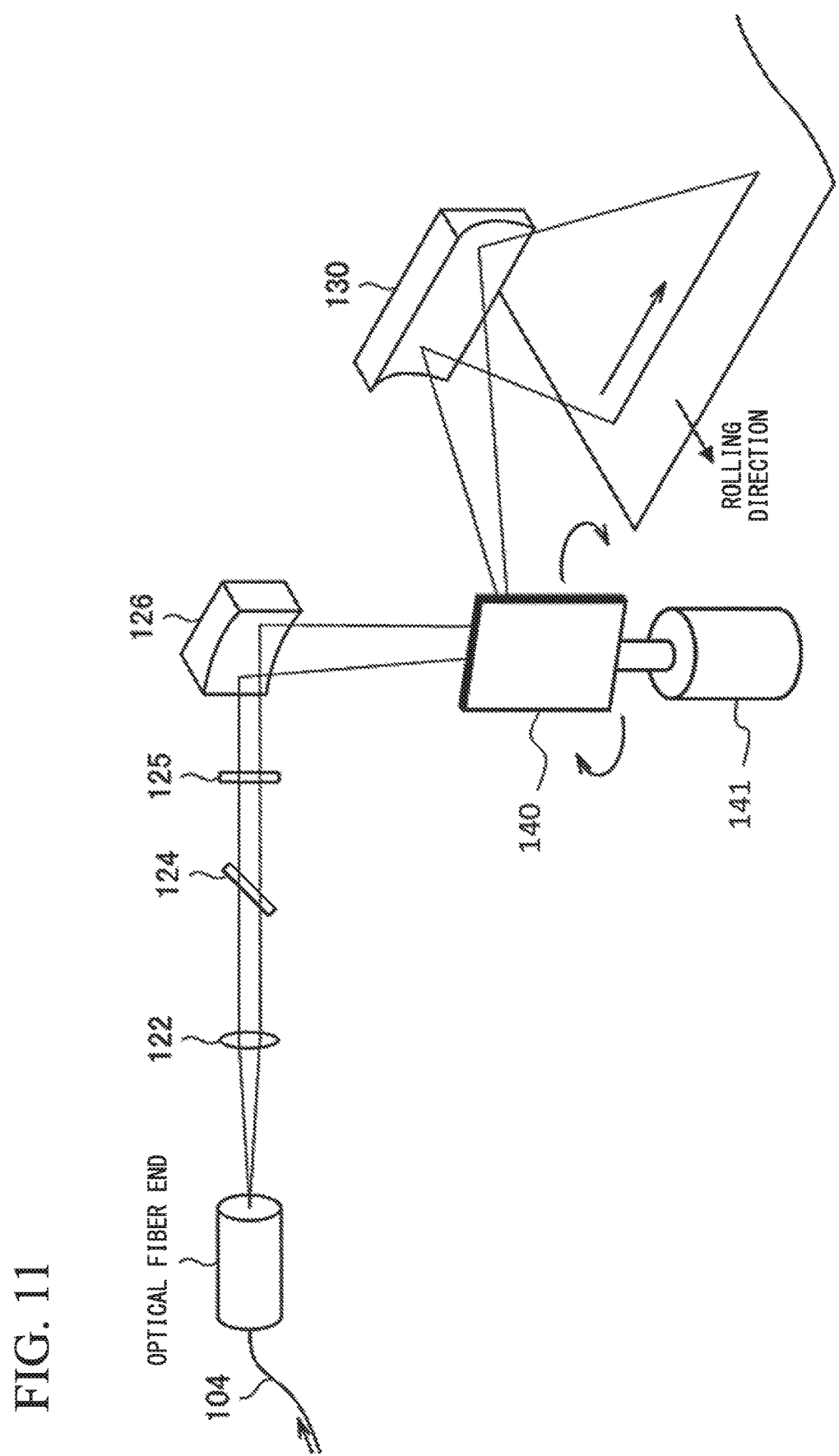
FIG. 11 is a view showing a modification example of the laser irradiation device 106.

As shown in FIG. 11, a galvano mirror 140 may be used instead of the polygon mirror 128. The galvano mirror 140 is driven by a driving motor 141 to rotate in arrow directions in the figure. As the galvano mirror 140 rotates, the grain-oriented electromagnetic steel sheet 10 is scanned with the laser beam along the sheet width direction thereof (scanning direction). In this configuration, it is possible to control the incident angle ϕ of the laser beam by controlling the rotational angle of the galvano mirror 140. Therefore, it is easy to set the maximum incident angle $\phi_{MAX}$ of the laser beam to an appropriate value by using the galvano mirror 140.

As described above, the angle θ between the linear polarization direction and the scanning direction can be adjusted by inserting an element to rotate the linear polarization direction of the laser beam, such as the λ/2 plate 125 (see FIG. 4). In the above description, the polarizing beam splitter 124 (see FIG. 4) which converts the unpolarized laser beam emitted from the laser oscillator 102 into the linearly polarized light is provided, but the present invention is not limited thereto. For example, when a laser which emits linearly polarized light is used as the laser oscillator 102, the polarizing beam splitter 124 can be omitted. Even in this case, a reduction in the temperature gradient along the thickness direction at the end portions P2 and P3 of the laser scanning width L can be limited. In addition, even though the λ/2 plate 125 is not inserted, in a case where the angle θ between the linear polarization direction and the scanning direction can be set to be in the preferred range, the λ/2 plate 125 can be omitted. For example, in a case where the angle θ can be set to be equal to or higher than 0° and lower than 45° by transmitting the laser beam onto the steel sheet from the laser oscillator 102 that emits linearly polarized light, the λ/2 plate 125 can be omitted.

<Refinement of Magnetic Domains and Defects in Glass Coating Film>

As described above, the grain-oriented electromagnetic steel sheet 10 in which a magnetic field is applied in the rolling direction has a structure in which a number of magnetic domains having a magnetization direction that substantially aligns with the rolling direction are structured. Here, in order to achieve a further reduction in the core loss of the grain-oriented electromagnetic steel sheet 10, it is effective to refine the magnetic domains (reduce the magnetic domains in width) through laser beam irradiation. Particularly, it is effective to obtain circulating current magnetic domains which are narrow and have sufficient strength by generating a significant temperature gradient along the thickness direction in a very narrow region that is present in the vicinity of the uppermost layer of the grain-oriented electromagnetic steel sheet 10 along the rolling direction.

On the other hand, when the temperature gradient along the thickness direction is increased, the temperature of the surface of the grain-oriented electromagnetic steel sheet 10 increases. Due to the temperature increase, there may be cases where defects are generated in the insulating coating film 16 or the glass coating film 14. Here, defects mean film damage such as defective peeling, swelling, alteration, and discoloration of the insulating coating film 16 and the glass coating film 14. In a case where defects are generated in the glass coating film 14, the steel sheet body 12 is exposed to the outside, and there is concern that rust may be generated. Therefore, in a case where defects are generated in the glass coating film 14, the insulating coating film 16 needs to be applied again, which causes an addition of a process and an increase in production costs.

During the production process of the grain-oriented electromagnetic steel sheet 10, many heat treatments are performed, and the interface structure and thickness of the glass coating film 14 or the insulating coating film 16 may vary in the rolling direction and width direction of the steel sheet body 12. Therefore, it was difficult to reliably limit the generation of defects in the glass coating film 14 over the entire steel sheet body 12 even when laser conditions are adjusted. Therefore, preventing the generation of defects in the glass coating film 14 while reducing the core loss of the grain-oriented electromagnetic steel sheet 10 is required.

According to this embodiment, not only the core loss can be reduced over the entire laser scanning width L, but also an effect of suppressing the generation of defects can be obtained. That is, in a laser magnetic domain control method in which an unpolarized laser beam is used in the related art, as described above, a temperature gradient in a laser scanning width decreases as the beam diameter at the end portions P2 and P3 of the laser scanning width L increases, and thus a reduction in core loss cannot be sufficiently obtained. In order to compensate for this, the power of the laser beam may be increased. In this case, while the core loss at the end portions P2 and P3 can be further reduced, the power of the laser beam absorbed by the center portion P1 of the laser scanning width L becomes excessive, and there is a problem that defects are easily generated. On the other hand, in this embodiment, as described above, in order to increase the absorptance of the laser beam at the end portions P2 and P3 of the laser scanning width L as described above, the grain-oriented electromagnetic steel sheet 10 is scanned with the linearly polarized light including the P-polarized light of which the absorptance increases as the incident angle ϕ increases. Here, at the center portion Pt of the laser scanning width L, since the linearly polarized light is incident perpendicular to the surface of the grain-oriented electromagnetic steel sheet 10 (the incident angle ϕ shown in FIGS. 6, 9A, and 9B is small), the absorptances of the P-polarized light and the S-polarized light at the center portion P1 are substantially the same (see FIG. 10). Since there is no difference in absorptance between the P-polarized light and the S-polarized light forming an unpolarized state, an increase in absorptance, which is caused by employing the P-polarized light, rarely occurs. Therefore, in the laser processing apparatus 100 of this embodiment, without an excessive increase in the power of the laser beam transmitted to the grain-oriented electromagnetic steel sheet 10 at the center portion P1 of the laser scanning width L, the power of the laser beam absorbed at the end portions P2 and P3 can be increased. Accordingly, a reduction in core loss and a suppression of the generation of defects can be realized over the entire laser scanning width L.

In the above-described embodiment, as shown in FIG. 1, an example in which the grain-oriented electromagnetic steel sheet 10 constituted by a three-layer structure including the base steel material 12, the glass coating film 14, and the insulating coating film 16 irradiated with the laser beam has been described. However, even for a steel sheet having two layers including the base steel material 12 and the insulating coating film 16 as the basic structure without the glass coating film 14, the laser processing apparatus 100 of this embodiment exhibits an effect of core loss over the laser scanning width L. This is because even when the glass coating film 14 is absent, by employing the linearly polarized light as the laser beam and setting the angle θ to be in the above-described range, the absorptance of the laser beam absorbed by the upper surfaces of the insulating coating film 16 and the base steel material 12 at the end portions P2 and P3 of the laser scanning width L can be increased. As a grain-oriented electromagnetic steel sheet without the glass coating film 14, a grain-oriented electromagnetic steel sheet in which the surface of a base steel material has small roughness and is close to a mirror surface and thus exhibits ultra-low core loss characteristics are provided is known. In the grain-oriented electromagnetic steel sheet having such ultra-low core loss characteristics, in order to prevent the generation of rust caused by the exposure of the base steel material 12, it is important that defects are not generated in the insulating coating film 16 during laser beam irradiation. As described above, in the laser processing apparatus 100 of this embodiment, a reduction in core loss over the entire laser scanning width L and the suppression of the generation of defects in the insulating coating film 16 are realized.

EXAMPLE

In order to confirm the effectiveness of Examples according to the embodiment described above, a confirmation test example according to Examples and Comparative Examples will be described.

First, a slab having a composition including Si: 3.0 mass %, C: 0.05 mass %, Mn: 0.1 mass %, acid-soluble Al: 0.02 mass %, N: 0.01 mass %, S: 0.01 mass %, P: 0.02 mass %, and Fe and unavoidable impurities as the remainder was prepared. Hot rolling was performed on the slab at 1280° C., thereby producing a hot rolled material having a thickness of 2.3 mm. Next, a heat treatment was performed on the hot rolled material under the condition of 1000° C.×1 minute. A pickling treatment was performed on the resultant after the heat treatment, and cold rolling was performed on the resultant, thereby producing a cold rolled material having a thickness of 0.23 mm. Decarburization annealing was performed on the cold rolled material under the condition of 800° C.×2 minutes. Next, an annealing separating agent primarily containing magnesia was applied to both surfaces of the cold rolled material after the decarburization annealing. In addition, the cold rolled material to which the annealing separating agent was applied was put in a batch type furnace in a state of being wound in a coil shape, and finishing annealing was performed thereon under the condition of 1200° C.×20 hours. Accordingly, a steel sheet base steel material (steel sheet body) having glass coating films formed on the surfaces was produced. Next, an insulating material formed of aluminum phosphate was applied onto the glass coating films and was baked (850° C.×1 minute), thereby forming insulating coating films.

The steel sheet base steel material having the insulating coating films and the glass coating films formed thereon was irradiated with a laser beam such that strain was given to the surface of the steel sheet base steel material.

As a laser irradiation device, the laser irradiation device 106 shown in FIG. 4 was used. As the laser oscillator 102, a fiber laser was used. In Examples, an unpolarized beam emitted from the collimator lens 122 was converted into linearly polarized light by the polarizing beam splitter 124. Thereafter, the linearly polarized laser beam was focused on and scanned on the grain-oriented electromagnetic steel sheet 10 while changing the angle θ between the linear polarization direction and the scanning direction by setting the linearly polarized light to pass through the λ/2 plate 125 and changing the rotational angle thereof. In Comparative Examples, an unpolarized laser beam was focused on and scanned on the grain-oriented electromagnetic steel sheet 10 without passing through the polarizing beam splitter 124 and the λ/2 plate 125. In both Examples and Comparative Examples, as the irradiation conditions of the laser beam, the power of the laser beam reaching the grain-oriented electromagnetic steel sheet 10 was set to 2 kW, the beam diameter thereof in the scanning direction was set to 4 mm, the beam diameter thereof in the rolling direction was set to 0.12 mm, and the laser scanning width was set to 500 mm. The maximum incident angle $\phi_{MAX}$ was 24°.

A portion of the laser-processed steel sheet and a portion in the steel sheet from the same coil, which was not subjected to laser processing, were subjected to a single sheet tester (SST), and the core loss at $W_{17/50}$ (W/kg) was evaluated. $W_{17/50}$ is the core loss at a frequency of 50 Hz and a maximum magnetic flux density of 1.7 T. As a test piece for the SST measurement, a rectangular piece which was cut into a size of 100 mm in length in the width direction of the steel sheet and 500 mm in length in the rolling direction of the steel sheet was used. Cutting positions in the width direction were 100 mm for each of the center portion and the end portion with respect to 500 mm of the laser scanning width. The core loss improvement ratio (%) of the laser-processed steel sheet was defined with respect to the core loss of the portion in the steel sheet from the same coil, which was not subjected to laser processing, as the reference.

The test results are shown in the following Table 1. In Comparative Example 1 in which the unpolarized laser beam was used, the core loss of the end portion was deteriorated compared to that of the center portion. On the other hand, in Examples 1 to 4, since the linearly polarized laser beam was used and the angle θ was set to be lower than 45°, an effect of improving the core loss of the end portion was obtained (improvement margin is meaningful because it is higher than about 0.5%, which is typically an error in evaluation of the core loss improvement ratio). Particularly, in a case where the angle θ was 200 or lower, the degree of deterioration of the core loss was lower than 0.5%, which means that there was actually no deterioration. On the other hand, in Comparative Example 2 in which the angle θ was 45°, there was no substantial difference in the core loss improvement ratio from that of Comparative Example 1 with the unpolarized light. This is because in a case where the angle θ is 45°, P-polarized light and S-polarized light are incident on an incident surface in an even ratio and an effect of increasing the absorptance of the laser beam at the end portion of the laser scanning width cannot be obtained. In Comparative Example 3 in which the angle θ is 60°, the core loss improvement ratio was lower than that of Comparative Example 1 with the unpolarized light. This is because the absorptance of the laser beam at the end portion of the laser scanning width was conversely decreased.

TABLE 1

| | Type of polarization | Angle θ (°) | Core loss improvement ratio of center portion (%) | Core loss improvement ratio of end portion (%) |
|---|---|---|---|---|
| Example 1 | Linearly polarized light | 0 | 13.4 | 13.2 |
| Example 2 | Linearly polarized light | 10 | 13.0 | 12.8 |
| Example 3 | Linearly polarized light | 20 | 13.1 | 12.8 |
| Example 4 | Linearly polarized light | 30 | 13.5 | 12.4 |
| Comparative Example 1 | Unpolarized light | — | 13.2 | 11.2 |
| Comparative Example 2 | Linearly polarized light | 45 | 13.2 | 11.3 |
| Comparative Example 3 | Linearly polarized light | 60 | 13.3 | 10.2 |

From the above-described test results, it can be seen that by setting the angle θ in a range where the effect of the P-polarized light out of the P-polarized light and S-polarized light becomes dominant, that is, by setting the angle θ to be equal to or higher than 0° and lower than 45°, the absorptance of the laser beam at the end portion of the laser scanning width can be increased compared to a case of unpolarized light, and as a result, the core loss improvement ratio at the end portion of the laser scanning width can be increased.

In addition, in a case where the angle θ between the linear polarization direction and the scanning direction is fixed to 0° and the maximum incident angle $\phi_{MAX}$ of the laser beam was changed in a range of 24° to 45°, a change in the core loss improvement ratio at the end portion of the laser scanning width L was checked. The results are shown in Table 2.

TABLE 2

| Maximum incident angle $\phi_{MAX}$ (°) | $1/\cos\phi_{MAX}$ | Core loss reduction ratio (%) |
|---|---|---|
| 24 | 1.09 | 13.2 |
| 30 | 1.15 | 12.9 |
| 33 | 1.19 | 12.5 |
| 36 | 1.24 | 12 |
| 40 | 1.31 | 11.4 |
| 45 | 1.41 | 10.5 |

As shown in Table 2, it could be seen that when the maximum incident angle $\phi_{MAX}$ of the laser beam was higher than 36°, the core loss improvement ratio of the end portion of the laser scanning width L was rapidly deteriorated. In a case where the maximum incident angle $\phi_{MAX}$ is 40° or higher, the core loss improvement ratio at the end portion of the laser scanning width L was equal to or lower than that of Comparative Example 1 (in a case of unpolarized light) shown in Table 1. It is thought that this is because when the maximum incident angle $\phi_{MAX}$ is higher than 36°, the magnification of a beam diameter with respect to the reference beam diameter becomes higher than 24%. That is, it was confirmed by the experiment that in order to uniformly and reliably reduce core loss over the entire laser scanning width L, it is preferable that the maximum incident angle $\phi_{MAX}$ of the laser beam be set on the basis of the above-described conditional expression (1).

CONCLUSION

As descried above, in the laser processing apparatus 100 according to this embodiment, the angle θ between the linear polarization direction of the light scanned on the grain-oriented electromagnetic steel sheet 10 and the scanning direction is set to be equal to or higher than 0° and lower than 45°.

Accordingly, the power of the laser beam transmitted to the steel sheet body 12 or the glass coating film 14 at the end portions P2 and P3 of the laser scanning width L of the laser irradiation device 106 can be increased. Therefore, even when the beam diameter at the end portions IP and P3 increases, a reduction in the power density of the laser beam at the end portions P2 and P3 can be limited. As a result, a reduction in the temperature gradient along the thickness direction at the end portions P2 and P3 of the laser scanning width L can be limited, and the difference in temperature gradient between the center portion P1 and the end portions P2 and P3 of the laser scanning width L can be reduced. Furthermore, as described above, since the power of the laser beam absorbed at the center portion P1 is not increased, the generation of defects in the center portion P1 can be suppressed. That is, reducing core loss and preventing the generation of defects in the glass coating film 14 can be simultaneously realized over the entire laser scanning width L.

In the laser processing apparatus 100 according to this embodiment, since a reduction in core loss and the limitation of defects in the glass coating film 14 described above can be achieved, the grain-oriented electromagnetic steel sheet 10 which has lower core loss than that in the related art along the whole width direction of the grain-oriented electromagnetic steel sheet 10 can be produced. As a result, the grain-oriented electromagnetic steel sheet 10 with ultra-low core loss can be supplied at a lower cost. Furthermore, from the viewpoint of realizing a reduction in energy consumption through the distribution of the grain-oriented electromagnetic steel sheet 10 with ultra-low core loss worldwide, a great economic effect is exhibited.

While the preferred embodiment of the present invention has been described in detail with reference to the accompanying drawings, the present invention is not limited to the examples. It should be noted by those skilled in the technical field to which the present invention belongs that various changes and modifications can be made without departing from the technical spirit described in the claims, and it should be understood that these changes and modifications naturally belong to the technical scope of the present invention.

BRIEF DESCRIPTION OF THE REFERENCE SYMBOLS

10: GRAIN-ORIENTED ELECTROMAGNETIC STEEL SHEET
12: STEEL SHEET BODY
14: GLASS COATING FILM
16: INSULATING COATING FILM
100: LASER PROCESSING APPARATUS
102: LASER OSCILLATOR
104: TRANSMISSION FIBER
106: LASER IRRADIATION DEVICE
122: COLLIMATOR LENS
124: POLARIZING BEAM SPLITTER
125: λ/2 PLATE
126: METALLIC MIRROR
128: POLYGON MIRROR
130: PARABOLIC MIRROR

The invention claimed is:

1. A laser processing apparatus for refining magnetic domains of a grain-oriented electromagnetic steel sheet by setting a linearly polarized laser beam to be focused on the grain-oriented electromagnetic steel sheet and scanned in a scanning direction, the laser processing apparatus comprising:
a laser oscillator configured to emit the linearly polarized laser beam, or a laser oscillator configured to emit a laser beam and a polarizer configured to convert the laser beam into the linearly polarized laser beam,
wherein an angle between a linear polarization direction of the linearly polarized laser beam focused on the grain oriented electromagnetic steel sheet and the scanning direction is equal to or higher than 0° and lower than 45° on a surface of the grain-oriented electromagnetic steel sheet and the scanning direction is substantially perpendicular to a transport direction of the grain-oriented electromagnetic steel sheet, and
wherein an incident angle φ of the laser beam into the surface of the grain-oriented electromagnetic steel sheet becomes 0° when an incident position of the laser beam is coincident with a center portion of a laser scanning width and the incident angle φ of the laser beam increases as the incident position of the laser beam approaches the end portions of the laser scanning width, and
wherein the laser beam has a degree of polarization defined as PW1/(PW1+PW2), a linearly polarized light having the degree of polarization of 0.9 or higher and lower than 1.0, wherein a power of a linearly polarized component is given by PW1 and a power of an orthogonal component is given by PW2.

2. The laser processing apparatus according to claim 1, wherein a maximum incident angle $\phi_{MAX}$ of the laser beam incident on the grain-oriented electromagnetic steel sheet satisfies the following conditional expression (1).

$$1/\cos \phi_{MAX} \leq 1.24 \tag{1}$$

3. The laser processing apparatus according to claim 1, wherein a wavelength of the laser beam focused on the grain-oriented electromagnetic steel sheet is 0.15 μm or higher and 7 μm or lower.

4. The laser processing apparatus according to claim 2, wherein a wavelength of the laser beam focused on the grain-oriented electromagnetic steel sheet is 0.15 μm or higher and 7 μm or lower.

5. The laser processing apparatus according to claim 1, wherein the laser oscillator is a fiber laser or a disk laser.

6. The laser processing apparatus according to claim 2, wherein the laser oscillator is a fiber laser or a disk laser.

7. The laser processing apparatus according to claim 3, wherein the laser oscillator is a fiber laser or a disk laser.

8. The laser processing apparatus according to claim 4, wherein the laser oscillator is a fiber laser or a disk laser.

9. The laser processing apparatus according to claim 1, wherein a shape of the laser beam focused on the grain-oriented electromagnetic steel sheet is an ellipse, and a minor axis direction of the ellipse is perpendicular to the scanning direction.

10. The laser processing apparatus according to claim 2, wherein a shape of the laser beam focused on the grain-oriented electromagnetic steel sheet is an ellipse, and
a minor axis direction of the ellipse is perpendicular to the scanning direction.

11. The laser processing apparatus according to claim 3, wherein a shape of the laser beam focused on the grain-oriented electromagnetic steel sheet is an ellipse, and
a minor axis direction of the ellipse is perpendicular to the scanning direction.

12. The laser processing apparatus according to claim 4, wherein a shape of the laser beam focused on the grain-oriented electromagnetic steel sheet is an ellipse, and
a minor axis direction of the ellipse is perpendicular to the scanning direction.

* * * * *